Oct. 8, 1963  H. T. WINCHEL  3,106,667
TIMING CIRCUIT
Filed Aug. 4, 1959
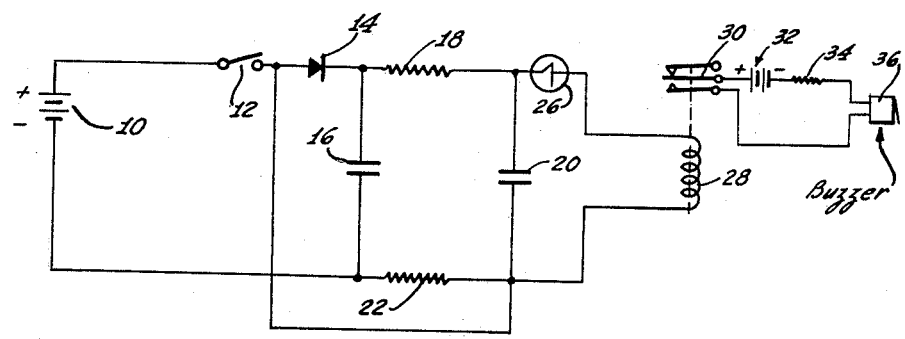
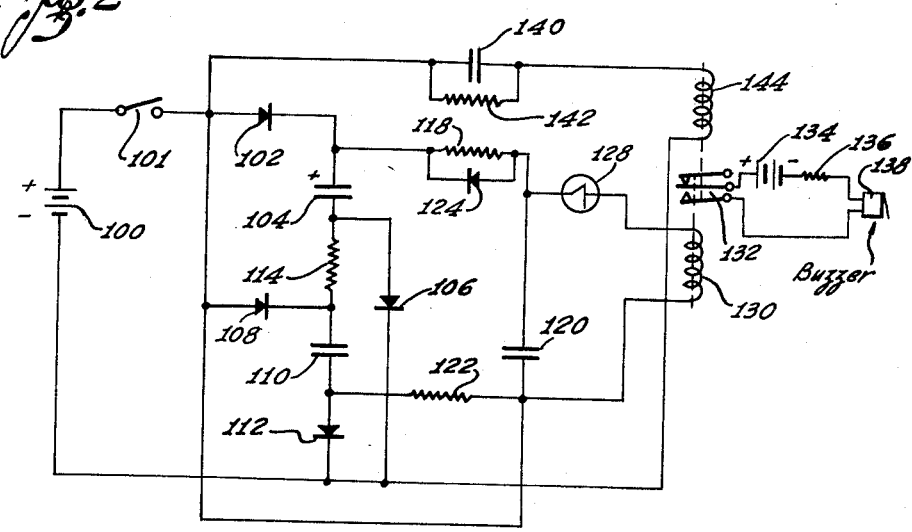
INVENTOR:
Henry T. Winchel
Smyth & Roston
Attorneys, United States Patent Office 3,106,667
Patented Oct. 8, 1963

3,106,667
TIMING CIRCUIT
Henry T. Winchel, Culver City, Calif., assignor to Consolidated Electronics Industries Corp., New York, N.Y., a corporation of Delaware
Filed Aug. 4, 1959, Ser. No. 831,537
18 Claims. (Cl. 317—148.5)

This invention relates to timing circuitry and more particularly to electronic circuitry for indicating with precision a particular period of time. The invention is especially concerned with electronic circuitry for indicating an interruption for a particular period of time in the introduction of voltage from a source. The invention is also concerned with novel circuitry for increasing the potential of the voltage from a source.

In many applications, it is desirable or even necessary to measure a period of time with a considerable degree of precision. For example, it may be desired in an industrial process to introduce precise amounts of a number of different materials to a mixing chamber so that a product with optimum properties is obtained. In order to provide the proper amount of each material in the mixture, it may be desirable or necessary to precisely control the amount of time for obtaining an introduction of each material to the mixture. Apparatus has been constructed for measuring such times with some precision when the times involved have been relatively long such as in the order of minutes. However, it has been more difficult to provide circuits which measure relatively short times such as milliseconds or seconds with precision.

In systems for processing materials, various other factors sometimes have to be measured. For example, the temperature for mixing the different materials may have to be regulated with some precision. Since the temperature may be regulated by controlling the amount of heat obtained through an electrical current, it may be necessary to provide an indication when an interruption in voltage has occurred for at least a particular period of time. Such an indication may be necessary since the temperature may become reduced below a minimum value required to obtain a proper mixture of the different materials when the voltage becomes interrupted for at least the particular period of time.

This invention provides a circuit which measures the amount of time that an interruption of voltage occurs. When the interruption in voltage occurs for at least a particular period of time, the circuit provides an output indication that the interruption of voltage has occurred. The circuitry constituting this invention operates without any moving parts and with a minimum number of components to provide such an output indication with a high degree of precision.

The circuitry constituting this invention includes at least a first capacitance which becomes charged from the voltage source during the time that the voltage is applied from the source. A second capacitance is coupled in a circuit with the first capacitance to receive the charge from the first capacitance upon an interruption in the voltage from the source. The second capacitance is also coupled electrically to the voltage source to prevent the second capacitance from being charged during the time that voltage is applied from the source. Upon an interruption in the voltage from the source, the first capacitance discharges through the second capacitance. The second capacitance is connected to a control member which provides a high impedance for voltages less than a particular value from the capacitance. However, the control member has characteristics to cause the impedance of the member to decrease to a low value when the voltage across the second capacitance increases above the particular value. This occurs in a period of time dependent upon the values of the first and second capacitances and upon the values of resistances included in the discharge circuit with the first and second capacitances. Upon the occurrence of the particular voltage across the second capacitance, the control member breaks down and the capacitance discharges through an output member such as a relay.

The circuitry constituting this invention also includes stages for increasing such as by a factor of "2" the voltage from the source. These stages include a pair of capacitances which effectively serve as the first capacitance mentioned above. The pair of capacitances are disposed in parallel with the voltage source during the time that voltage is applied from the source. Because of this parallel arrangement, each capacitance becomes charged to a value dependent upon the voltage from the source. When the voltage from the source becomes interrupted, the pair of capacitances are connected to the second capacitance described in the previous paragraphs so as to discharge on a series basis through the second capacitance. Because of the series relationship, the pair of capacitances provide a potential greater than that from the source.

Other advantages of the invention will become apparent from a detailed description of the invention in connection with the accompanying drawings, in which FIGURE 1 is a circuit diagram of electrical circuitry constituting one embodiment of the invention; and FIGURE 2 is a circuit diagram of electrical circuitry constituting a second embodiment of the invention.

In the embodiment shown in FIGURE 1, a source 10 is adapted to provide a suitable direct voltage such as approximately 60 volts. The source 10 may be a battery or any other suitable means for providing a direct voltage. The positive terminal of the source 10 is connected to the movable arm of a single-pole, single throw switch 12, which may be manually operated. The stationary contact of the switch 12 has a common connection with the anode of a diode 14, which may be a silicon diode such as type 1N461 manufactured by the Hughes Aircraft Company. A capacitance 16 having a suitable value such as approximately 60 microfarads is connected between the cathode of the diode 14 and the negative terminal of the voltage source 10.

A resistance 18, a capacitance 20 and a resistance 22 are in series across the capacitance 16. The resistance 18, the capacitance 20 and the resistance 22 may be respectively provided with suitable values in the order of 200 kilo-ohms, 30 microfarads and 5 milo-ohms. The common terminal between the capacitance 20 and the resistance 22 is connected to the stationary contact of the switch 12.

One terminal of a control member such as a diode 26 is connected to the terminal common to the resistance 18 and then capacitance 20. The control member 26 may be provided with characteristics so as to provide a relatively high impedance in the order of several megohms for voltages less than a particular value and so as to provide a relatively low impedance in the order of a few ohms for voltages equal to or greater than the particular value. For example, the control member 26 may be a diode designated as a multi-layer bistable transistor diode and manufactured by the Shockley Transistor Corporation of Palo Alto, California. By way of illustration, the control member may be constructed to provide a high impedance for voltages of less than 20 volts and to provide a low impedance for voltages equal to or greater than 20 volts.

An output member such as a relay 28 is connected between the second terminal of the control member 26 and the terminal common to the capacitance 20 and the resistance 22. The output member 28 may be coupled to the movable arm of a single-pole, double-throw switch 30. The movable arm and the lower stationary contact of the switch 30 in FIGURE 1 may be connected in a series circuit with a battery 32, a resistance 34 and an alarm member such as a buzzer 36. It will be appreciated that the buzzer 36 is included only by way of illustration and that other apparatus for providing output indications may also be used.

When the switch 12 becomes closed as by manual operation, current flows through a circuit including the voltage source 10, the switch 12, the diode 14 and the capacitance 16. This current charges the capacitance 16 to a value substantially equal to the voltage from the source 10. Although the capacitance 20 is connected across the capacitance 16, the current from the source 10 cannot flow through the capacitance 20 to charge the capacitance. The reason is that the potential at the cathode of the diode 14 is substantially equal to the potential at the terminal common to the capacitance 20 and the resistance 22. This causes a potential of substantially zero volts to be produced across the capacitance 20 during the time that the potential is applied from the source 10.

Upon an interruption in the voltage from the source 10, the terminal common to the capacitance 20 and the resistance 22 is no longer biased with a positive potential. This causes the capacitance 16 to discharge through a circuit including the capacitance 16, the resistance 18, the capacitance 20 and the resistance 22. The capacitance 16 is able to discharge only through the capacitance 20 since the diode 14 prevents the capacitance 16 from discharging through the source 10. The rate of discharge of the capacitance 16 into the capacitance 20 is dependent upon the values of the capacitances 16 and 20 and upon the values of the resistance 18 and 22. For example, the capacitance 16 discharges at an increased rate through the capacitance 20 when the values of the resistances 18 and 22 are decreased.

When the discharge of the capacitance 16 through the capacitance 20 has occurred for a particular period of time dependent upon the values of the capacitances 16 and 20 and the resistances 18 and 22, the potential across the capacitance 20 rises above the value required to break down the control member 26. The capacitance 20 is then able to discharge with a relatively large current through a circuit including the control number 26 and the output member 28. The discharge occurs with a large current since both the control member 26 and the output member 28 now present low impedances to the capacitance 20. The flow of current through the relay 28 is sufficiently large to cause the movable arm of the switch 30 to become actuated into engagement with the lower contact of the stationary switch in FIGURE 1. This completes a circuit to the buzzer 36 so that an output indication may be provided.

The circuit shown in FIGURE 1 and described above has certain important advantages. Since the capacitance 20 cannot become charged during the time that voltage is applied from the source 10, the capacitance 20 is responsive only to the discharge of the capacitance 16. This causes the capacitance 20 to receive a particular voltage such as 20 volts for breaking down the control member 26 only after the passage of the desired period of time, such period of time being measured only from the instant that the interruption of voltage from the source 10 occurs. Furthermore, the inclusion of the control member 26 is advantageous in that the control member prevents the output member 28 from being energized until the passage of the particular period of time. The inclusion of the control member 26 is also advantageous in that the impedance of the control member changes to a low value after the particular period of time so that the capacitance 20 is able to discharge through a low impedance path which includes the output member 28.

The embodiment shown in FIGURE 2 includes concepts similar to those discussed above with respect to FIGURE 1 and also includes additional concepts. For example, the embodiment shown in FIGURE 2 includes a novel circuit for increasing the voltage from a source 100 of direct voltage. Because of this, the voltage provided by the source 100 may be reduced in value relative to that provided by the source 10 in FIGURE 1 so as to have a suitable value such as approximately 30 volts. The movable arm of a switch 101 may be connected to the positive terminal of the source 100. The switch 101 may be manually operated.

The anode of a diode 102 has a common connection with the stationary contact of the switch 101, and the cathode of the diode has a common connection with one plate of a capacitance 104. The anode of a diode 106 is connected to the second plate of the capacitance 104 and the cathode of the diode 106 is connected to the negative terminal of the voltage source 100. The diodes 102 and 106 may be silicon diodes such as the type 1N461 manufactured by the Hughes Aircraft Company, and the capacitance 104 may be provided with a suitable value in the order of 100 microfarads.

A diode 108, a capacitance 110 and a diode 112 are connected to the voltage source 100 in a circuit arrangement similar to that described above for the diode 102, the capacitance 104 and the diode 106. The diode 108, the capacitance 110 and the diode 112 may be provided with parameters similar to those of the diode 102, the capacitance 104 and the diode 106. A resistance 114 having a suitable value in the order of 5 kilo-ohms is connected between the second plate of the capacitance 104 and the first plate of the capacitance 110.

A resistance 118, a capacitance 120 and a resistance 122 are in series between the cathode of the diode 102 and the anode of the diode 112. The resistance 118, the capacitance 120 and the resistance 122 may be respectively provided with suitable values such as 200 kilo-ohms, 50 microfarads and 5 kilo-ohms. The cathode of a diode 124 is connected to the cathode of the diode 102, and the anode of the diode 124 is connected to the terminal common to the resistance 118 and the capacitance 120.

A control member 128 corresponding to the control member 26 in FIGURE 1 is connected to the terminal common to the resistance 118 and the capacitance 120. Output means such as a relay winding 130 is connected between the control member 128 and the terminal common to the capacitance 120 and the resistance 122. The movable arm of a single-pole double-throw switch 132 is magnetically coupled to the relay 130 so as to be actuated into engagement with the lower stationary contact in the switch in FIGURE 2 when the relay 130 is energized. A battery 134, a resistance 136 and an alarm such as a buzzer 138 are in series with the movable arm and the lower stationary contact of the switch 132 in FIGURE 2.

The positive terminal of the voltage source 100 is also connected through the switch 101 to the terminal common to the capacitance 120 and the resistance 122 and is further connected to first terminals of a capacitance 140 and a resistance 142. The capacitance 140 and the resistance 142 may be respectively provided with suitable values such as 5 microfarads and 10 kilo-ohms. The second terminals of the capacitance 140 and the resistance 142 have a common connection with one terminal of a relay 144, the second terminal of which is connected to the negative terminal of the voltage source 100. The relay 144 is magnetically coupled to the movable arm of the switch 132 to actuate the movable arm into engagement with the upper stationary contact of the switch in FIGURE 2 when the relay becomes energized.

When the switch 101 is closed as by manual operation, current flows through a circuit including the voltage source 100, the switch 101, the diode 102, the capacitance 104 and the diode 106. This current charges the capacitance 104 so that a potential corresponding to that of the source 100 is produced across the capacitance. Current also flows through a circuit including the voltage source 100, the switch 101, the diode 108, the capacitance 110 and the diode 112. In this way, the capacitance 110 becomes charged to the same potential as the capacitance 104.

During the time that the voltage is provided by the source 100, neither of the capacitances 104 and 110 is able to discharge through the other capacitance. This results from the inclusion of the diode 102 in the circuit with the capacitance 104 and from the inclusion of the diode 108 in the circuit with the capacitance 110. Furthermore, the capacitance 120 cannot become charged during the time that the voltage is provided by the source 100. This results from the fact that the diode 102 has a zero potential across it and from the further fact that the potential across the diode is applied to the opposite plates of the capacitance 120.

The resistance 114 serves an important purpose during the time that the voltage from the source 100 is applied to the capacitances 104 and 110 to charge the capacitances. If the resistance 114 were not connected between the capacitances 104 and 110, a direct connection would result between the two capacitances whereby the positive plate of the capacitance 110 would be connected to the relatively negative plate of the capacitance 104. By including the resistance 114, a potential is produced across the resistance to allow for differences in the potential on the lower plate of the capacitance 104 and on the upper plate of the capacitance 110.

Upon the interruption of the voltage from the source 100, a positive potential is no longer applied to the terminal common to the capacitance 120 and the resistance 122. This causes the capacitances 104 and 110 to discharge on a series basis through a circuit including the capacitance 104, the resistance 118, the capacitance 120, the resistance 122, the capacitance 110 and the resistance 114. Since the capacitances 104 and 110 are in series in this discharge circuit, the voltage presented to the capacitance 120 is approximately twice that provided by either of the capacitances 104 and 110.

When the capacitances 104 and 110 have discharged through the capacitance 120 for a particular period of time, the voltage across the capacitance exceeds the breakdown voltage of the control member 128. This causes the impedance of the control member 128 to become relatively low such that the capacitance 120 is able to discharge with relatively large current through the relay 130. The current flowing through the relay 130 is sufficiently large to obtain the actuation of the movable arm of the switch 132 into engagement with the lower stationary contact of the switch in FIGURE 2. This causes the alarm 138 to be energized.

As will be seen, the alarm 138 becomes energized at a particular period of time after the interruption of the voltage from the source 100. This particular period of time is dependent upon the values of certain components such as the capacitances 104, 110 and 120 and the resistances 114, 118 and 122 and is further dependent upon the characteristics of the control member 128.

During the time that the voltage is applied from the source 100, the capacitance 140 becomes charged. This prevents the relay 144 from receiving a sufficient current to actuate the movable arm of the switch 132. However, upon the interruption in the voltage from the source 100 the capacitance 140 discharges through the resistance 142. If the capacitance 140 should be able to discharge sufficiently through the resistance 142 because of an extended interruption in the voltage from the source 100, a relatively large charging current flows through the capacitance 140 upon a subsequent application of the voltage from the source 100. This charging current energizes the relay 144 so that the movable arm of the switch 132 becomes actuated into engagement with the upper stationary contact of the switch. This opens the circuit to the alarm 138.

When the voltage from the source 100 is applied after an interruption in such voltage, the potential across the capacitance 120 becomes reduced to zero for the reasons described above. This causes the capacitance 120 to discharge through the capacitances 104 and 110. The discharge is facilitated because of the inclusion of the diode 124, which provides a low impedance across the resistance 118 during the time that the capacitance 120 is discharging into the capacitances 104 and 110.

The circuit shown in FIGURE 2 and described above has all of the advantages of the circuit shown in FIGURE 1. The circuit shown in FIGURE 2 is further advantageous because of the inclusion of the voltage-multiplying circuitry. By providing such circuitry, the voltage from the source 100 can be reduced to obtain a desired output. Although stages are shown for doubling the voltage from the source 100, it should be appreciated that additional stages can further be provided to obtain additional increases in the output voltage.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. Timing circuitry, including, a source of direct voltage, means including a first capacitance coupled electrically to the source of direct voltage to become charged during the application of voltage from the source, means including second capacitance means coupled electrically to the first capacitance and to the voltage from the source to prevent the second capacitance from becoming charged during the application of voltage from the source and to obtain a discharge of the first capacitance through the second capacitance upon an interruption in the voltage from the source, and means responsive only to the charge on the second capacitance for providing an output indication upon the occurrence of a particular charge in the second capacitance.

2. Timing circuitry, including, a source of voltage, means including a second capacitance coupled electrically to the voltage source to obtain a charge of the capacitance upon the application of voltage from the source, means including a second capacitance coupled electrically to the voltage source to obtain a charge of the second capacitance upon the application of voltage from the source, means including a third capacitance coupled electrically to the voltage source and to the first and second capacitances for preventing the first and second capacitances from discharging through the third capacitance during the application of voltage from the source and for obtaining a discharge of the first and second capacitances on a multiplying basis through the third capacitance upon an interruption in the voltage from the source, and means coupled electrically to the third capacitance for providing an output indication upon the production of a particular voltage in the third capacitance as a result of a discharge of the first and second capacitances through the third capacitance.

3. The timing circuitry set forth in claim 2 in which the means coupled electrically to the third capacitance is responsive only to the voltage on the third capacitance for providing an output indication upon the production of a particular voltage in the third capacitance as a result of a discharge of the first and second capacitances through the third capacitance.

4. Timing circuitry, including, a source of direct voltage, means including a first capacitance coupled electrically to the voltage source to receive a charge from the voltage source upon the application of a voltage from the source, means including a second capacitance coupled electrically at opposite ends to the first capacitance to obtain a discharge of the first capacitance through the second capacitance upon an interruption in the voltage from the source, the second capacitance being coupled electrically at one end to the voltage source to prevent the second capacitance from becoming charged by the first capacitance during the application of the voltage by the source, control means responsive only to the voltage on the second capacitor providing a high impedance upon the introduction of a voltage less than a particular value and providing a low impedance upon the introduction of a voltage at least equal to the particular value, and means coupled electrically to the second capacitance and to the control means for receiving a discharge from the capacitance upon the production of a low impedance in the control means to provide an output indication.

5. The timing circuitry set forth in claim 4 in which unidirectional means are connected in a circuit with the first capacitance and the voltage source to prevent the first capacitance from discharging through the voltage source upon an interruption in the voltage from the source.

6. Timing circuitry, including, a source of direct voltage, means including a first capacitance and a diode coupled electrically to the voltage source to provide a charge in the capacitance upon the application of a potential from the source, resistance means, a second capacitance included in a series circuit with the resistance means and the first capacitance to provide a discharge of the first capacitance through the second capacitance, there being an electrical coupling between the second capacitance and the voltage source to prevent the first capacitance from discharging through the second capacitance during the time that voltage is being applied from the source to the first capacitance, control means responsive only to the potential on the second capacitance to prevent the second capacitance from discharging upon the occurrence of a potential less than a particular value across the capacitance, and output means connected in a series circuit with the control means and the second capacitance to provide an output indication upon a discharge of the second capacitance.

7. Timing circuitry, including, a source of direct voltage, means including first unidirectional means and a first capacitance connected in a first series circuit with the voltage source to obtain a charge of the capacitance upon the application of a voltage from the source, means including second unidirectional means and a second capacitance connected in a second series circuit with the voltage source to obtain a charge of the capacitance upon the application of a voltage from the source, means including a third capacitance connected in a series circuit with the first and second capacitances upon an interruption in the voltage from the source to obtain a discharge of the first and second capacitances through the third capacitance, there being an electrical coupling between the third capacitance and the voltage source to prevent the first and second capacitances from discharging through the third capacitance upon the application of voltage from the source, a control member coupled to the third capacitance for preventing the third capacitance from discharging for a voltage less than a particular value across the capacitance, and output means coupled to the control member for providing an output indication upon a discharge of the capacitance through the control member.

8. The timing circuitry set forth in claim 7, including, means including electrical circuitry coupled to the voltage source for becoming energized upon an application of the voltage from the source after an interruption of the voltage from the source for a particular period of time.

9. The timing circuitry set forth in claim 7 in which first unidirectional means are connected in a circuit with the voltage source and the first capacitance to prevent the first capacitance from discharging through the voltage source upon an interruption in the voltage from the source and in which second unidirectional means are connected in a circuit with the voltage source and the second capacitance to prevent the second capacitance from discharging through the voltage source upon an interruption in the voltage from the source.

10. The timing circuitry as set forth in claim 7 wherein the control member is responsive only to the voltage appearing across the third capacitor to prevent the third capacitance from discharging for a voltage less than a particular value across the capacitance.

11. In combination, a source of direct voltage, means including first unidirectional means and a first capacitance connected in a circuit with the voltage source to obtain a charging of the capacitance, means including second unidirectional means and a second capacitance connected in a circuit with the voltage source to obtain a charging of the capacitance, a resistance connected between the plate having a relatively negative charge in the first capacitance and the plate having a relatively positive charge in the second capacitance to maintain the plates at different potentials, and impedance means connected in a circuit with the first and second capacitances and responsive to an interruption in the voltage from the source to obtain a discharge of the first and second capacitances in a series circuit through the impedance means.

12. In combination, a source of direct voltage, means including first and second capacitances and including unidirectional means connected in electrical circuits with the voltage source to obtain a parallel charging of the first and second capacitances during the application of a voltage from the source, and means including electrical circuitry coupled to the first and second capacitances to obtain a discharge of the first and second capacitances on a series basis upon an interruption in the voltage from the source, the electrical circuitry being coupled to the voltage source to prevent a discharge of the first and second capacitances during the application of the voltage from the source.

13. In combination, a source of direct voltage, means including first unidirectional means and a first capacitance connected in a circuit with the voltage source to obtain a charge of the capacitance, means including second unidirectional means and a second capacitance connected in a circuit with the voltage source to obtain a charge of the second capacitance, a resistance connected between the first and second capacitances to provide a series relationship between the capacitances and a voltage across the capacitances greater than the voltage from the source, and means including an impedance member connected across the first and second capacitances to obtain a discharge of the capacitances in a series relationship upon an interruption in the voltage from the source.

14. Timing circuitry, including, a source of voltage, means including a first capacitance coupled electrically to the source of voltage to become charged during the application of voltage from the source, a second capacitance connected across the first capacitance to obtain a discharge of the first capacitance to the second capacitance, there being a connection from the voltage source to the second capacitance to prevent the first capacitance from discharging through the second capacitance upon the application of a voltage from the source, and means responsive only to the charge on the second capacitance for providing an output indication upon the occurrence of a particular charge in the second capacitance.

15. The timing circuitry set forth in claim 14 in which unidirectional means are included in an electrical circuit with the source of voltage and the first capacitance to prevent the first capacitance from discharging through the voltage source upon an interruption in the voltage from the source.

16. Timing circuitry, including, a source of voltage, means including a first capacitance coupled electrically to the voltage source to obtain a charge of the first capacitance upon the application of voltage from the source, means including a second capacitance coupled electrically to the voltage source to obtain a charge of the second capacitance upon the application of voltage from the source, means connected to the first and second capacitances to provide for the synchronous charging of the first and second capacitances by the voltage source, means including a third capacitance coupled electrically to the first and second capacitances for obtaining a discharge of the first and second capacitances on a multiplying basis through the third capacitance upon an interruption in the voltage from the source, there being a connection from the voltage source to the third capacitance to prevent the first and second capacitances from discharging through the third capacitance during the application of voltage from the source, and means coupled electrically to the third capacitance for providing an output indication upon the production of a particular voltage in the third capacitance as a result of a discharge of the first and second capacitances through the third capacitance.

17. The timing circuitry set forth in claim 16 in which first unidirectional means are included in an electrical circuit with the source of voltage and the first capacitance to prevent the first capacitance from discharging through the voltage source upon an interruption in the voltage from the source and in which second unidirectional means are included in a second electrical circuit with the source of voltage and the second capacitance to prevent the second capacitance from discharging through the voltage source upon an interruption in the voltage from the source.

18. The timing circuitry set forth in claim 16 wherein the means coupled electrically to the third capacitance is responsive only to the voltage on the third capacitance to provide an output indication upon the production of a particular voltage in the third capacitance as a result of a discharge of the first and second capacitances through the third capacitance.

References Cited in the file of this patent

UNITED STATES PATENTS

| | | |
|---|---|---|
| 2,114,016 | Dimond | Apr. 12, 1938 |
| 2,710,365 | MacDougall | June 7, 1955 |
| 2,831,111 | Bivens | Apr. 15, 1958 |
| 2,929,992 | Carter | Mar. 22, 1960 |
| 2,956,183 | Culbertson | Oct. 11, 1960 |

FOREIGN PATENTS

| | | |
|---|---|---|
| 765,149 | Germany | Feb. 8, 1954 |